United States Patent
Wang et al.

(10) Patent No.: US 10,250,159 B2
(45) Date of Patent: Apr. 2, 2019

(54) FIVE-LEVEL INVERTER TOPOLOGY WITH HIGH VOLTAGE UTILIZATION RATIO

(71) Applicants: Hongliang Wang, Hefei (CN); Yan-Fei Liu, Kingston (CA)

(72) Inventors: Hongliang Wang, Hefei (CN); Yan-Fei Liu, Kingston (CA)

( * ) Notice: Subject to any disclaimer, the term of this patent is extended or adjusted under 35 U.S.C. 154(b) by 0 days.

(21) Appl. No.: 15/767,721

(22) PCT Filed: Nov. 7, 2016

(86) PCT No.: PCT/CN2016/104937
§ 371 (c)(1),
(2) Date: Apr. 12, 2018

(87) PCT Pub. No.: WO2017/076366
PCT Pub. Date: May 11, 2017

(65) Prior Publication Data
US 2018/0309383 A1     Oct. 25, 2018

Related U.S. Application Data

(60) Provisional application No. 62/252,111, filed on Nov. 6, 2015.

(51) Int. Cl.
*H02M 7/483* (2007.01)
*H02M 1/32* (2007.01)
*H02M 7/5387* (2007.01)
*H02M 7/487* (2007.01)

(52) U.S. Cl.
CPC ............ *H02M 7/483* (2013.01); *H02M 1/32* (2013.01); *H02M 7/5387* (2013.01); *H02M 7/487* (2013.01); *Y02E 10/56* (2013.01)

(58) Field of Classification Search
CPC ....... H02M 7/483; H02M 7/5387; H02M 1/32
See application file for complete search history.

(56) References Cited

U.S. PATENT DOCUMENTS

| | | | |
|---|---|---|---|
| 2013/0249322 A1* | 9/2013 | Zhang | H02M 7/483 307/151 |
| 2016/0043659 A1* | 2/2016 | Xu | H02M 1/088 363/131 |
| 2016/0268924 A1* | 9/2016 | Fu | H02M 7/483 |
| 2017/0149336 A1* | 5/2017 | Kidera | H02M 7/483 |

\* cited by examiner

*Primary Examiner* — Jue Zhang

(57) ABSTRACT

A five-voltage level inverter topology circuit and a three-phase five-voltage level inverter topology circuit, suitable for use with two series-connected direct current (DC) power sources, include a half-bridge inverter circuit having a first circuit module and a second circuit module. The half-bridge inverter circuit outputs five voltage levels including a 0V level. The five-voltage level inverter topology circuit has a five-voltage level half-bridge structure, and only requires an alternating current (AC) filtering inductor, thereby reducing system cost and size, removing leakage current, and providing high efficiency.

25 Claims, 8 Drawing Sheets

FIVE-LEVEL INVERTER TOPOLOGY WITH HIGH VOLTAGE UTILIZATION RATIO

This application is a 35 U.S.C. 371 of International Patent Application No. PCT/CN2016/104937, filed on Nov. 7, 2016, and claims the benefit of the filing date of U.S. application Ser. No. 62/252,111, filed on Nov. 6, 2015. The contents of both applications are incorporated herein by reference in their entirety.

FIELD OF THE INVENTION

The invention relates to power converter topology, especially to five-level inverter topology.

BACKGROUND

With the increasing threat of global energy and serious environmental problem, the renewable energy has been developing fast. Photovoltaic industry has an extensive future as its resources are plentiful and widespread. It is an important issue to lower cost and improve efficiency for photovoltaic system.

It is known that photovoltaic arrays yield DC power. An inverter is used to convert DC from photovoltaic arrays into AC in photovoltaic systems. There is a common mode loop circuit in the photovoltaic inverter system without a transformer. The high frequency leakage current in the loop circuit leads to electromagnetic interference, and at the same time, it is dangerous to devices and human. So the high frequency leakage current becomes a critical issue to be solved for the transformerless inverter system.

Inverters are divided into two kinds according to the circuit structure.

The first kind of inverter is symmetry in topology and it has double AC filtering inductors. Full bridge inverter circuit is usually of this kind. No additional circuit in the full bridge inverter circuit is needed to boost input voltage in many cases since it is enough for half of that of the half-bridge. But it is difficult for the full bridge inverter to cancel substantially the high frequency leakage current because of the parasitic parameters within the inverter system. The improvements of conventional H4 full bridge circuit are made to reduce the high frequency leakage current so that it meets the industry standard. However, its cost is high because the two AC filtering inductors' magnetic cores are not common for the symmetry mode. In addition, cost is high because of double AC filtering inductors.

The second kind of inverter is non-symmetry and it has single AC filtering inductor. Half bridge and mid-point clamped inverter circuits are examples of this kind. One terminal of AC utilities or AC load is connected to the mid-point of DC input voltage for the single phase inverter. The parasitic capacitor voltage is constant so that the leakage current is eliminated substantially. However, it needs an additional circuit to increase the input voltage as the voltage utilization ratio of the half bridge based inverter (the second kind) is half of that of a full bridge based inverter (the first kind). This additional circuit reduces the system efficiency and increases the system cost.

For the three-phase inverter system, three-level half-bridge inverter is often used. However, its cost is high because (1) the voltage utilization ratio equals one and it is low, (2) the AC filtering inductance is high and (3) additional circuitry is needed to increase the input DC voltage.

SUMMARY

To solve the above problems, provided in the invention is five-level inverter topology. For the sake of brevity, the term "bidirectional switch" as used herein is intended to refer to a semiconductor switch where the current can flow in both directions and withstand voltage in one direction, such as IGBT with a parallel diode, or MOSFET where the parallel diode is inherent.

The five-level inverter topology is used with a first DC power supply and a second DC power supply. The negative terminal of the first DC power supply is connected to the positive terminal of the second DC power supply. The five-level inverter topology at least comprises a half-bridge inverter circuit that outputs five mutually different voltage levels including zero; wherein the half-bridge inverter circuit at least comprises a floating capacitor that is charged by the first DC power supply or the second DC power supply.

In some implementation, these two DC power supplies are implemented by another DC power supply in parallel with two capacitors connected in series. Each capacitor acts as a DC power supply.

According to a first aspect of the invention, there is provided a single phase five-level inverter topology. It comprises a half-bridge inverter circuit that outputs five mutually different voltage levels including zero.

The half-bridge inverter circuit provided in the invention comprises a first circuit module and a second circuit module.

The first circuit module in the half-bridge inverter circuit comprises a first terminal, a second terminal and a third terminal. There is at least two circuit branches in the first circuit module: one is connected between the first terminal and the second terminal, and the other one is connected between the first terminal and the third terminal. The first terminal of the first circuit module is connected to the common terminal of the two DC power supplies.

The second circuit module comprises a floating capacitor, a current limiting device, a first input terminal, a second input terminal, a third input terminal, a fourth input terminal and an output terminal. There is at least one circuit branch between each of the input terminals and the output terminal.

The second terminal of the first circuit module is connected to the third input terminal of the second circuit module and the third terminal of the first circuit module is connected to the fourth input terminal of the second circuit module. The first input terminal of the second circuit module is connected to the positive terminal of the first DC power supply and the second input terminal of the second circuit module is connected to the negative terminal of the second DC power supply. The output terminal of the second circuit module is connected to a first terminal of AC utilities or AC load. The common terminal of the two DC power supplies is connected to a second terminal of AC utilities or AC load.

The current limiting device in the second circuit module has many implementations, such as an inductor, resistor, semiconductor device operated at active mode or linear mode, or the combination of the above devices. The current limiting device is used to limit the surge current when the floating capacitor is charged. That is, the current limiting device forms part of the charging circuit loop of the floating capacitor.

In some implementation, the current limiting device is comprised of an inductor.

The first circuit module provides at least two circuit branches: one circuit branch is connected between the first DC power supply and one input terminal of the second circuit module, and the other one is connected between the second DC power supply and another input terminal of the second circuit module. The two circuit branches are extended to the floating capacitor inside of the second circuit module.

The floating capacitor is charged by the first DC power supply or the second DC power supply. Either the first DC power supply or the second DC power supply provides power for the load of the half-bridge inverter circuit, or the first DC power supply or the second DC power supply alternatively added algebraically to the floating capacitor provides power for the load of the half-bridge inverter circuit. The second circuit module outputs five mutually different voltage levels including zero.

In some embodiments, the second circuit module further comprises a first switching circuit branch, a second switching circuit branch, a third switching circuit branch, a fourth switching circuit branch, a fifth switching circuit branch and a sixth switching circuit branch.

The first terminal of the first switching circuit branch is connected to the first input terminal of the second circuit module and the second terminal of the first switching circuit branch is connected to the first terminal of the second switching circuit branch whose second terminal is connected to the second input terminal of the second circuit module. The first terminal of the third switching circuit branch is connected to both the third input terminal of the second circuit module and the positive terminal of the floating capacitor. The second terminal of the third switching circuit branch is connected to the first terminal of the fourth switching circuit branch whose second terminal is connected to both the fourth input terminal of the second circuit module and the negative terminal of the floating capacitor. The common terminal of the third and the fourth switching circuit branches is connected to the common terminal of the first and the second switching circuit branches. The first terminal of the fifth switching circuit branch is connected to the positive terminal of the floating capacitor and the second terminal of the fifth switching circuit branch is connected to the first terminal of the sixth switching circuit branch whose second terminal is connected to the negative terminal of the floating capacitor. The common terminal of the fifth and the sixth switching circuit branches is connected to the output terminal of the second circuit module.

In some embodiments, the common terminal of the third and the fourth switching circuit branches is connected to the common terminal of the first and the second switching circuit branches through the current limiting inductor.

In some embodiments, the second circuit module is connected to a filtering inductor which is connected between the output terminal of the second circuit module and the first terminal of AC utilities or AC load. The filtering inductor is used to filter the switching frequency component and achieve a load current with almost a sinusoidal waveform.

In some embodiments, the first switching circuit branch comprises a first bidirectional switch; the second switching circuit branch comprises a second bidirectional switch; the third switching circuit branch comprises a third bidirectional switch; the fourth switching circuit branch comprises a fourth bidirectional switch; the fifth switching circuit branch comprises a fifth bidirectional switch; and the sixth switching circuit branch comprises a sixth bidirectional switch. The first terminal of each bidirectional switch is connected to the first terminal of the switching circuit branch in which it is located. The second terminal of each bidirectional switch is connected to the second terminal of the switching circuit branch in which it is located.

In some embodiments, either of the circuit branches connected between the first terminal and the second terminal of the first circuit module and between the first terminal and the third terminal of the first circuit module comprises at least one bidirectional switch.

In some embodiments, the first circuit module comprises a first bidirectional switch, a first diode, a second diode, a third diode, and a fourth diode.

The positive terminal of the first diode is connected to the first terminal of the first circuit module and its negative terminal is connected to the first terminal of the first bidirectional switch. The negative terminal of the third diode is connected to the negative terminal of the first diode, and the positive terminal of the third diode is connected to the third terminal of the first circuit module. The negative terminal of the second diode is connected to the positive terminal of the first diode, and the positive terminal of the second diode is connected to the second terminal of the first bidirectional switch. At the same time, the negative terminal of the fourth diode is connected to the second terminal of the first circuit module, and its positive terminal is connected to the positive terminal of the second diode.

In some embodiments, the first circuit module comprises a first bidirectional switch, a second bidirectional switch, a first diode and a second diode.

The positive terminal of the first diode is connected to the negative terminal of the second diode and the negative terminal of the first diode is connected to the first terminal of the first bidirectional switch. The second terminal of the first bidirectional switch is connected to the second terminal of the first circuit module. The positive terminal of the second diode is connected to the second terminal of the second bidirectional switch whose first terminal is connected to the third terminal of the first circuit module. The common terminal of the first diode and the second diode is connected to the first terminal of the first circuit module.

In some embodiments, the first circuit module comprises a first bidirectional switch, a second bidirectional switch, a first diode, a second diode, a third diode, a fourth diode, a fifth diode, a sixth diode, a seventh diode and an eighth diode.

The positive terminal of the first diode is connected to the negative terminal of the second diode and the negative of the first diode is connected to the first terminal of the first bidirectional switch. The positive terminal of the second diode is connected to the second terminal of the first bidirectional switch. The common terminal of the first diode and the second diode is connected to the first terminal of the first circuit module.

The positive terminal of the third diode is connected to the negative terminal of the fourth diode and the negative of the third diode is connected to the first terminal of the first bidirectional switch. The positive terminal of the fourth diode is connected to the second terminal of the first bidirectional switch. The common terminal of the third diode and the fourth diode is connected to the second terminal of the first circuit module.

The positive terminal of the fifth diode is connected to the negative terminal of the sixth diode. The negative terminal of the fifth diode is connected to the first terminal of the second bidirectional switch. The positive terminal of the sixth diode is connected to the second terminal of the second bidirectional switch. The common terminal of the fifth diode and the sixth diode is connected to the first terminal of the first circuit module.

The positive terminal of the seventh diode is connected to the negative terminal of the eighth diode. The negative of the seventh diode is connected to the first terminal of the second bidirectional switch. The positive terminal of the eighth diode is connected to the second terminal of the second bidirectional switch. The common terminal of the seventh diode and the eighth diode is connected to the third terminal of the first circuit module.

In some embodiments, the first circuit module comprises a first bidirectional switch, a second bidirectional switch, a third bidirectional switch and a fourth bidirectional switch.

The second terminal of the first bidirectional switch is connected to the first terminal of the second bidirectional switch, and the first terminal of the first bidirectional switch is connected to the first terminal of the third bidirectional switch whose second terminal is connected to the second terminal of the first circuit module. The common terminal of the first bidirectional switch and the second bidirectional switch is connected to the first terminal of the first circuit module. At the same time, the second terminal of the second bidirectional switch is connected to the second terminal of the fourth bidirectional switch whose first terminal is connected to the third terminal of the first circuit module.

According to a second aspect of the invention, there is provided a three-phase five-level inverter topology. It comprises three single phase five-level inverter topologies provided in the first aspect of the invention. The three single phase five-level inverter topologies are connected in parallel at their input sides. The AC output terminals of the three single phase five-level inverter topologies are respectively connected to three phases of AC utilities or AC load.

Disclosed is single phase five-level inverter topology comprising a half-bridge inverter circuit with a floating capacitor, wherein both the system cost and the size is reduced, the leakage current is eliminated substantially and high efficiency is achieved by using five-level half-bridge structure with only one AC filtering inductor. Provided also is three-phase five-level inverter topology wherein the voltage utilization ratio is twice that of the present three-phase five-level half-bridge inverter under the same operating conditions by using the floating capacitor; the AC filtering inductance is smaller than that of the three-level half-bridge inverter because of the five-level structure; the mid-point voltage of the two DC power supplies (especially two serially combining capacitors connected in parallel to one DC power supply) is balanced as they alternatively charging the floating capacitor with an equality of opportunity. That is to say, the DC link mid-point voltage can be balanced without additional circuitry.

The five-level inverter topology provided in the invention can be used for, but not limited to, renewable energy power system, such as single-phase or three-phase photovoltaic system.

BRIEF DESCRIPTION OF THE DRAWINGS

In order to clearly present this invention, the circuit implementations discussed in the invention are accompanied with the following drawing.

FIG. 2 (b) is a circuit diagram in partial block form of a single phase five-level inverter topology with another schematic circuit diagram of the second circuit module M2 according to an embodiment of the invention.

FIG. 14 (b) is the circuit diagram in partial block form of a three-phase five-level inverter topology based on the equivalent circuit in FIG. 14(a) according to an embodiment of the invention.

For convenience in description, identical components have been given the same reference numbers in the various drawings. The same symbols like "V" as used in one drawing are intended to refer to be connected to each other.

DETAILED DESCRIPTION OF THE EMBODIMENTS

Figure 1:
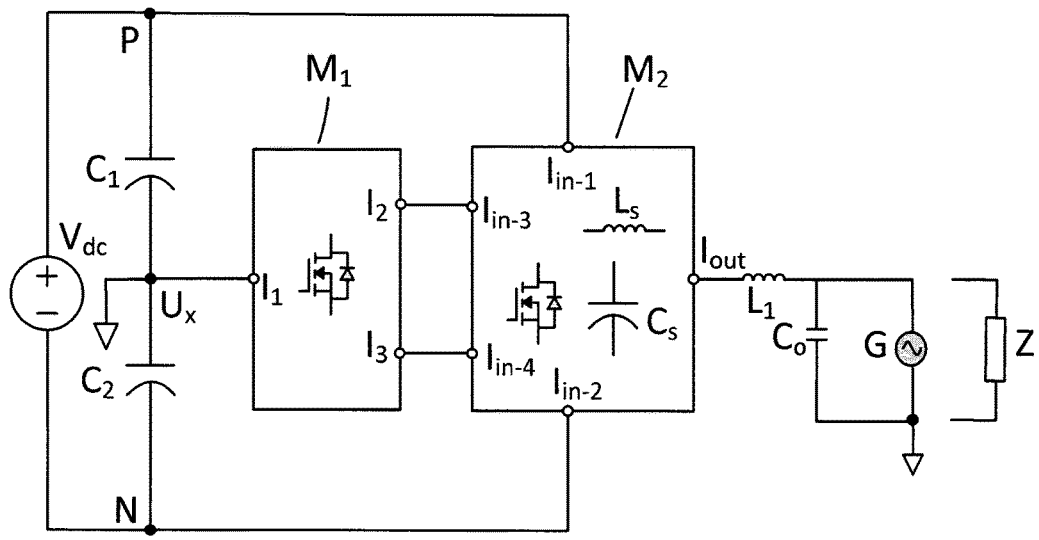
FIG. 1 is a circuit diagram in partial block form of a single phase five-level inverter topology according to an embodiment of the invention.

Provided herein is five-level inverter topology. For a better understanding of the invention, and to show more clearly how it may be carried into effect, embodiments will be described in detail with reference of the accompanying drawings. Of course, the embodiments described below are part of the invention examples, not all of them. Those skilled in the art will recognize or be able to ascertain variants of the embodiments described herein. Such variants are within the scope of the invention and are covered by the appended claims.

As shown in figures below, the term $V_{dc}$ is DC power supply voltage, M1 and M2 are respectively the first and the second circuit module in the half-bridge inverter circuit, $C_1$ is a first capacitor which acts as the first DC power supply, $C_2$ is a second capacitor which acts as the second DC power supply and $C_s$ is the floating capacitor.

For the purpose of this description in the invention, the ratio of the peak-peak value of AC output voltage from inverter to the minimum DC input voltage is defined as voltage utilization ratio. The minimum DC input voltage in the invention equals the DC power supply voltage $V_{dc}$.

For the purpose of this description, diode will be used below as a non-limiting example for all the elements characterized by single directional conduction in the invention. The positive terminal of diode is referred to Anode and the negative terminal is Cathode. It will be understood that other suitable devices may be used for the elements in the invention.

For the purpose of this description, the switch MOSFET will be used as a non-limiting example for all the semiconductor switches characterized by controllable conduction in the invention. Take the N-channel MOSFET for example. The first terminal of N-channel MOSFET is referred to Drain, the second terminal is Source and the control terminal is Gate. The control terminal of each semiconductor switch in the invention is provided with its own control signal. For the sake of brevity, it is not described repeatedly below. It will be understood that other suitable devices, for example, IGBT may be used for the semiconductor switches in the invention.

For the sake of brevity, the term "bidirectional switch" as used herein is intended to refer to a semiconductor switch where the current can flow in both directions and withstand voltage in one direction, such as IGBT with a parallel diode, or MOSFET where the parallel diode is inherent.

The five-level inverter topology is used with a first DC power supply and a second DC power supply. The negative terminal of the first DC power supply is connected to the positive terminal of the second DC power supply. The five-level inverter topology comprises a half-bridge inverter circuit that outputs five mutually different voltage levels including zero; wherein the half-bridge inverter circuit comprises a first circuit module and a second circuit module; the second circuit module comprises a floating capacitor. The first circuit module provides at least two circuit branches connected between either of the two DC power supplies and the second circuit module. The two circuit branches are extended to the floating capacitor inside of the second circuit module. The floating capacitor is charged by the first DC power supply or the second DC power supply. Either the first DC power supply or the second DC power supply provides power for the load of the half-bridge inverter circuit, or the first DC power supply or the second DC power supply alternatively added algebraically to the floating capacitor provides power for the load of the half-bridge inverter circuit.

According to the above basic idea of the invention, embodiments will be described in detail with reference of the accompanying drawings.

FIG. 1 shows a circuit diagram in partial block form of a single phase five-level inverter topology. It is connected to two capacitors (the first capacitor $C_1$ and the second capacitor $C_2$) connected in series. Each capacitor acts as a DC power supply. The single phase five-level inverter topology comprises a half-bridge inverter circuit that outputs five mutually different voltage levels including zero.

The half-bridge inverter circuit comprises a first circuit module M1 and a second circuit module M2. The first circuit module comprises a first terminal $I_1$, a second terminal $I_2$ and a third terminal $I_3$. There is at least two circuit branches: one is connected between the first terminal $I_1$ and the second terminal $I_2$ and the other one is connected between the first terminal $I_1$ and the third terminal $I_3$. The first terminal $I_1$ of the first circuit module M1 is connected to the common terminal $U_x$ of the first capacitor $C_1$ and the second capacitor $C_2$.

The second circuit module M2 comprises a floating capacitor $C_s$, a current-limiting inductor $L_s$, a first input terminal $I_{in-1}$, a second input terminal $I_{in-2}$, a third input terminal $I_{n-3}$, a fourth input terminal $I_{in-4}$ and an output terminal $I_{out}$. There is at least one circuit branch between each of the input terminals and the output terminal $I_{out}$.

The second terminal $I_2$ of the first circuit module M1 is connected to the third input terminal $I_{in-3}$ of the second circuit module M2 and the third terminal $I_3$ of the first circuit module M1 is connected to the fourth input terminal $I_{in-4}$ of the second circuit module M2. The first input terminal $I_{in-1}$ of the second circuit module M2 is connected to the positive terminal of the first capacitor $C_1$ and the second input terminal $I_{in-2}$ of the second circuit module M2 is connected to the negative terminal of the second capacitor $C_2$. The output terminal $I_{out}$ of the second circuit module M2 is connected to a first terminal of a filtering inductor $L_1$ whose second terminal is connected to a first terminal of AC utilities or AC load. The common terminal of the two capacitors (the first capacitor $C_1$ and the second capacitor $C_2$) is connected to a second terminal of AC utilities or AC load.

The current-limiting inductor $L_s$ is a current limiting device. It will be understood that other current limiting devices, for example, resistor, semiconductor device operated at active mode or linear mode, or the combination of the above devices may be used in the invention. Besides, the current-limiting inductor $L_s$ works together with the filtering inductor $L_1$ to filter the switching frequency component and achieve a load current with almost a sinusoidal waveform. The inductance of the current-limiting inductor $L_s$ is very small. To be more precise, it is enough for the current-limiting inductor $L_s$ with one percent of the filtering inductor $L_1$ inductance. So the voltage on the current-limiting inductor $L_s$ is very small or even can be ignored.

The basic function of the first circuit module M1 is to provide circuit branches for the floating capacitor $C_s$ to be charged to the desired voltage value which is equal to or close to the voltage level of $C_2$ and $C_2$, and to limit the current when the floating capacitor $C_s$ is charged. The circuit branches between the first terminal $I_1$ and the second terminal $I_2$ of the first circuit module M1 or between the first terminal $I_1$ and the third terminal $I_3$ of the first circuit module M1 form part of the charging circuit path from the first capacitor $C_1$ (i.e. the first DC power supply) or the second capacitor $C_2$ (i.e. the second DC power supply) to the floating capacitor $C_s$.

The second circuit module M2 receives input signals between its any two different input terminals and produces five mutually different voltage levels including zero through the output terminal $I_{out}$.

Figure 2:
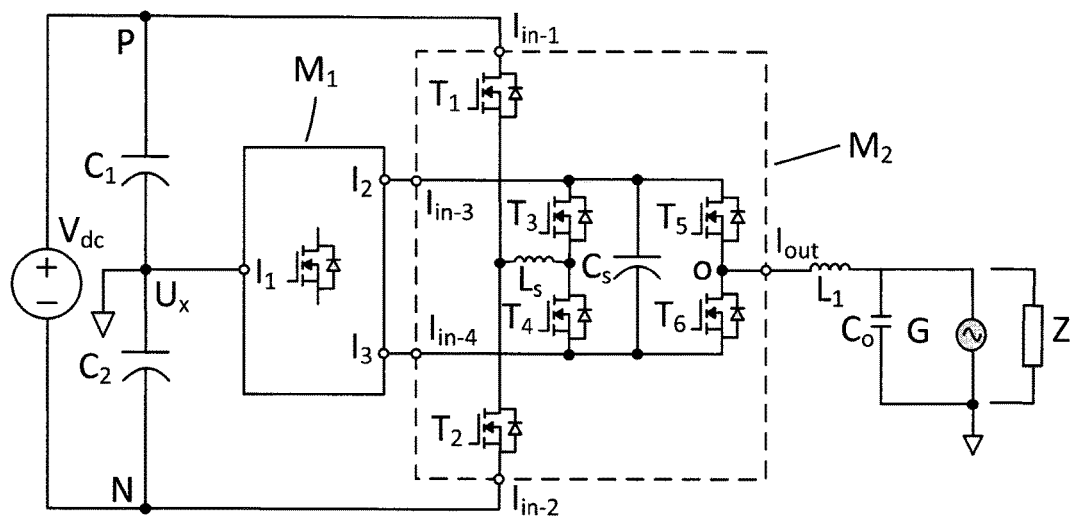
FIG. 2 (a) is a circuit diagram in partial block form of a single phase five-level inverter topology with one schematic circuit diagram of the second circuit module M2 according to an embodiment of the invention.
Figure 2:
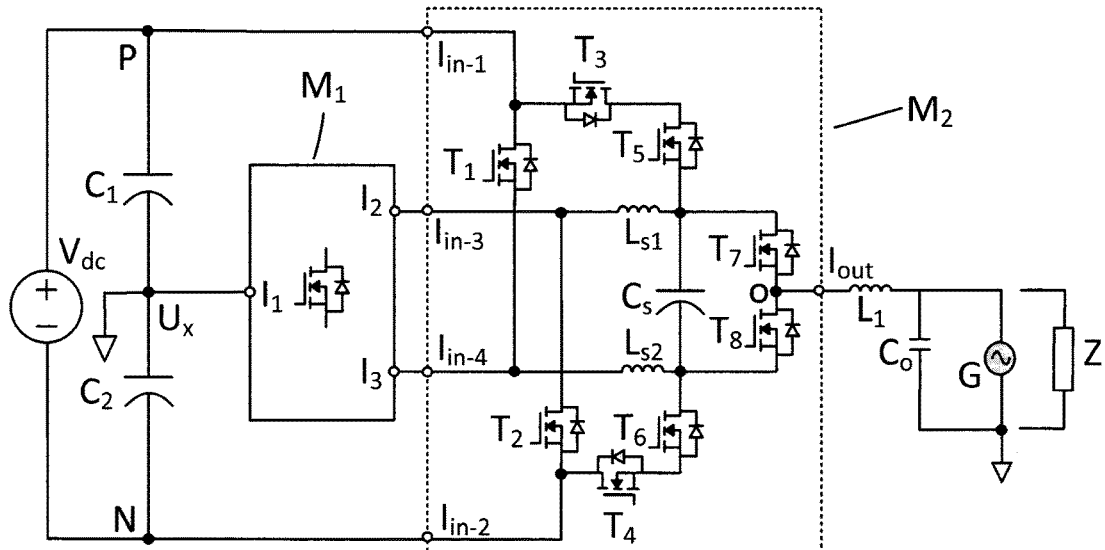

FIG. 2(a) shows one circuit diagram of the second circuit module M2. It comprises a floating capacitor $C_s$, a first switching circuit branch, a second switching circuit branch, a third switching circuit branch, a fourth switching circuit branch, a fifth switching circuit branch, a sixth switching circuit branch and a current-limiting inductor $L_s$. Each switching circuit branch comprises a bidirectional switch. For the purpose of this description, each bidirectional switch is given the same subscript number symbol as the switching circuit branch in which it is located. For example, the bidirectional switch in the first switching circuit branch is marked as $T_1$.

The first terminal of the first bidirectional switch $T_1$ is connected to the positive terminal of the first capacitor $C_1$ and the second terminal of the first bidirectional switch $T_1$ is connected to the first terminal of the second bidirectional switch $T_2$ whose second terminal is connected to the negative terminal of the second capacitor $C_2$. The first terminal of the third bidirectional switch $T_3$ is connected to both the second terminal $I_2$ of the first circuit module M1 and the positive terminal of the floating capacitor $C_s$. The second terminal of the third bidirectional switch $T_3$ is connected to the first terminal of the fourth bidirectional switch $T_4$ whose second terminal is connected to both the third terminal $I_3$ of the first circuit module M1 and the negative terminal of the floating capacitor $C_s$. The common terminal of the third and the fourth bidirectional switches is connected to the common terminal of the first and the second bidirectional switches through the current-limiting inductor $L_s$. The first terminal of the fifth bidirectional switch $T_5$ is connected to the positive terminal of the floating capacitor $C_s$ and the second terminal of the fifth bidirectional switch $T_5$ is connected to the first terminal of the sixth bidirectional switch $T_6$ whose second terminal is connected to the negative terminal of the floating capacitor $C_s$. The common terminal of the fifth and the sixth bidirectional switches is connected to the first terminal of AC utilities or AC load through the filtering inductor $L_1$. The common terminal of the first capacitor $C_1$ and the second capacitor $C_2$ is connected to the second terminal of AC utilities or AC load.

The current-limiting inductor $L_s$ in FIG. 2(a) can be replaced by two current-limiting inductors. The first current-limiting inductor works in the positive half cycle of the grid voltage while the second one doesn't work and the second one works in the negative half cycle of the grid voltage while the first one doesn't work. The circuit diagram of the second circuit module M2 shown in FIG. 2(b) is a non-limiting example.

FIG. 2(b) shows another circuit diagram of the second circuit module M2. It comprises a floating capacitor $C_s$, a first bidirectional switch $T_1$, a second bidirectional switch $T_2$, a third bidirectional switch $T_3$, a fourth bidirectional switch $T_4$, a fifth bidirectional switch $T_5$, a sixth bidirectional switch $T_6$, a seventh bidirectional switch $T_7$, an eighth bidirectional switch $T_8$, a first current-limiting inductor $L_{s1}$ and a second current-limiting inductor $L_{s2}$.

The first terminal of the first bidirectional switch $T_1$ is connected to the positive terminal of the first capacitor $C_1$ and the second terminal of the first bidirectional switch $T_1$ is connected to both the third terminal $I_3$ of the first circuit module M1 and the first terminal of the second current-limiting inductor $L_{s2}$. The first terminal of the second bidirectional switch $T_2$ is connected to both the second terminal $I_2$ of the first circuit module M1 and the first terminal of the first current-limiting inductor $L_{s1}$. The second terminal of the second bidirectional switch $T_2$ is connected to the negative terminal of the second capacitor $C_2$. The second terminal of the third bidirectional switch $T_3$ is connected to the first terminal of the first bidirectional switch $T_1$ and the first terminal of the third bidirectional switch $T_3$ is connected to the first terminal of the fifth bidirectional switch $T_5$. The second terminal of the fifth bidirectional switch $T_5$ is connected to both the second terminal of the first current-limiting inductor $L_{s1}$ and the positive terminal of the floating capacitor $C_s$. The first terminal of the sixth bidirectional switch $T_6$ is connected to both the second terminal of the second current-limiting inductor $L_{s2}$ and the negative terminal of the floating capacitor $C_s$. The second terminal of the sixth bidirectional switch $T_6$ is connected to the second terminal of the fourth bidirectional switch $T_4$ whose first terminal is connected to the second terminal of the second bidirectional switch $T_2$. The first terminal of the seventh bidirectional switch $T_7$ is connected to the positive terminal of the floating capacitor $C_s$ and the second terminal of the seventh bidirectional switch $T_7$ is connected to the first terminal of the eighth bidirectional switch $T_8$. The second terminal of the eighth bidirectional switch $T_8$ is connected to the negative terminal of the floating capacitor $C_s$. The common terminal of the seventh bidirectional switch $T_7$ and the eighth bidirectional switch $T_8$ is connected to the first terminal of AC utilities or AC load through the filtering inductor $L_1$.

Figure 3:
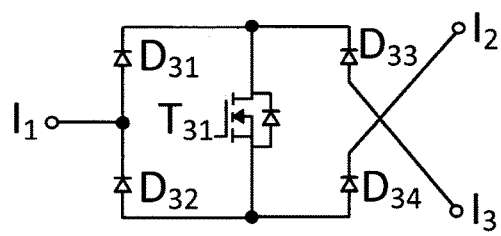
FIG. 3 is the first schematic circuit diagram of the first circuit module M1 for the single phase five-level inverter topology according to an embodiment of the invention.

FIG. 3 shows the first schematic circuit diagram of the first circuit module M1 for the single phase five-level inverter topology according to an embodiment of the invention. The first circuit module M1 comprises a first bidirectional switch $T_{31}$, a first diode $D_{31}$, a second diode $D_{32}$, a third diode $D_{33}$, and a fourth diode $D_{34}$.

The positive terminal of the first diode $D_{31}$ is connected to the first terminal $I_1$ of the first circuit module M1 and the negative terminal of the first diode $D_{31}$ is connected to the first terminal of the first bidirectional switch $T_{31}$. The negative terminal of the third diode $D_{33}$ is connected to the negative of the first diode $D_{31}$, and the positive terminal of the third diode $D_{33}$ is connected to the third terminal $I_3$. The negative terminal of the second diode $D_{32}$ is connected to the positive terminal of the first diode $D_{31}$, and the positive terminal of the second diode $D_{32}$ is connected to the second terminal of the first bidirectional switch $T_{31}$. At the same time, the negative terminal of the fourth diode $D_{34}$ is connected to the second terminal $I_2$, and the positive terminal of the fourth diode $D_{34}$ is connected to the positive terminal of the second diode $D_{32}$.

Figure 4:
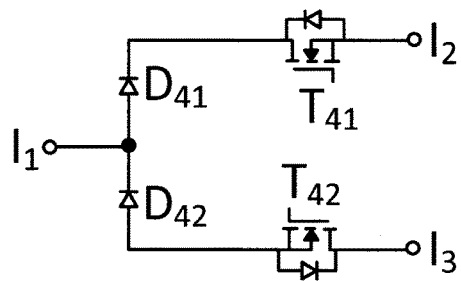
FIG. 4 is the second schematic circuit diagram of the first circuit module M1 for the single phase five-level inverter topology according to an embodiment of the invention.

FIG. 4 shows the second schematic circuit diagram of the first circuit module M1 for the single phase five-level inverter topology according to an embodiment of the invention. The first circuit module M1 comprises a first bidirectional switch $T_{41}$, a second bidirectional switch $T_{42}$, a first diode $D_{41}$ and a second diode $D_{42}$.

The positive terminal of the first diode $D_{41}$ is connected to the negative terminal of the second diode $D_{42}$ and the negative terminal of the first diode $D_{41}$ is connected to the first terminal of the first bidirectional switch $T_{41}$. The second terminal of the first bidirectional switch $T_{41}$ is connected to the second terminal $I_2$ of the first circuit module M1. The positive terminal of the second diode $D_{42}$ is connected to the second terminal of the second bidirectional switch $T_{42}$ whose first terminal is connected to the third terminal $I_3$ of the first circuit module M1. The common terminal of the first diode $D_{41}$ and the second diode $D_{42}$ is connected to the first terminal $I_1$ of the first circuit module M1.

Figure 5:
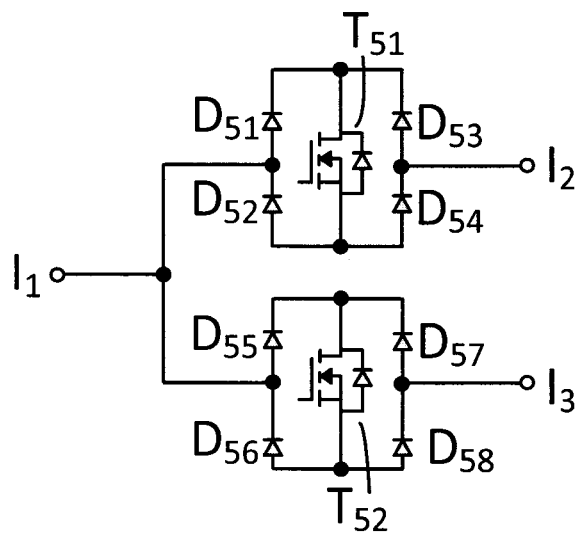
FIG. 5 is the third schematic circuit diagram of the first circuit module M1 for the single phase five-level inverter topology according to an embodiment of the invention.

FIG. 5 shows the third schematic circuit diagram of the first circuit module M1 for the single phase five-level inverter topology according to an embodiment of the invention. The first circuit module M1 comprises a first bidirectional switch $T_{51}$, a second bidirectional switch $T_{52}$, a first diode $D_{51}$~ an eighth diode $D_{58}$.

The positive terminal of the first diode $D_{51}$ is connected to the negative terminal of the second diode $D_{52}$ and the negative terminal of the first diode $D_{51}$ is connected to the first terminal of the first bidirectional switch $T_{51}$. The positive terminal of the second diode $D_{52}$ is connected to the second terminal of the first bidirectional switch $T_{51}$. The common terminal of the first diode $D_{51}$ and the second diode $D_{52}$ is connected to the first terminal $I_1$ of the first circuit module M1.

The positive terminal of the third diode $D_{53}$ is connected to the negative terminal of the fourth diode $D_{54}$ and the negative terminal of the third diode $D_{53}$ is connected to the first terminal of the first bidirectional switch $T_{51}$. The positive terminal of the fourth diode $D_{54}$ is connected to the second terminal of the first bidirectional switch $T_{51}$. The common terminal of the third diode $D_{53}$ and the fourth diode $D_{54}$ is connected to the second terminal $I_2$ of the first circuit module M1.

The positive terminal of the fifth diode $D_{55}$ is connected to the negative terminal of the sixth diode $D_{56}$. The negative terminal of the fifth diode $D_{55}$ is connected to the first terminal of the second bidirectional switch $T_{52}$. The positive terminal of the sixth diode $D_{56}$ is connected to the second terminal of the second bidirectional switch $T_{52}$. The common terminal of the fifth diode $D_{55}$ and the sixth diode $D_{56}$ is connected to the first terminal $I_1$ of the first circuit module M1.

The positive terminal of the seventh diode $D_{57}$ is connected to the negative terminal of the eighth diode $D_{58}$. The negative of the seventh diode $D_{57}$ is connected to the first terminal of the second bidirectional switch $T_{52}$. The positive terminal of the eighth diode $D_{58}$ is connected to the second terminal of the second bidirectional switch $T_{52}$. The common terminal of the seventh diode $D_{57}$ and the eighth diode $D_{58}$ is connected to the third terminal $I_3$ of the first circuit module M1.

Figure 6:
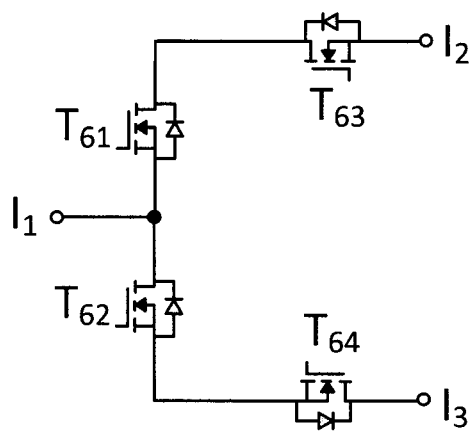
FIG. 6 is the fourth schematic circuit diagram of the first circuit module M1 for the single phase five-level inverter topology according to an embodiment of the invention.

FIG. 6 shows the fourth schematic circuit diagram of the first circuit module M1 for the single phase five-level inverter topology according to an embodiment of the invention. The first circuit module M1 comprises a first bidirectional switch $T_{61}$, a second bidirectional switch $T_{62}$, a third bidirectional switch $T_{63}$ and a fourth bidirectional switch $T_{64}$.

The second terminal of the first bidirectional switch $T_{61}$ is connected to the first terminal of the second bidirectional switch $T_{62}$, and the first terminal of the first bidirectional switch $T_{61}$ is connected to the first terminal of the third bidirectional switch $T_{63}$ whose second terminal is connected to the second terminal $I_2$ of the first circuit module M1. The common terminal of the first bidirectional switch $T_{61}$ and the second bidirectional switch $T_{62}$ is connected to the first terminal $I_1$ of the first circuit module M1. At the same time, the second terminal of the second bidirectional switch $T_{62}$ is connected to the second terminal of the fourth bidirectional switch $T_{64}$ whose first terminal is connected to the third terminal $I_3$ of the first circuit module M1.

Figure 7:
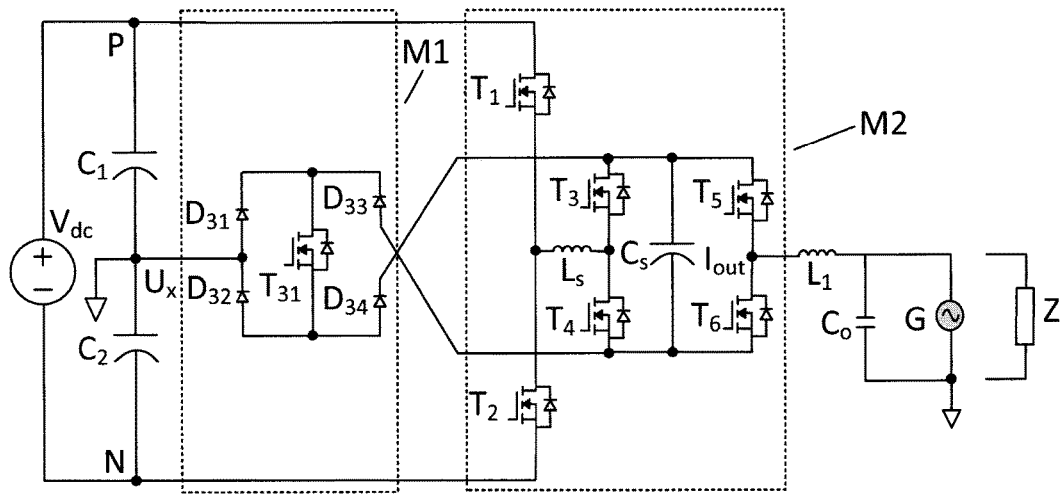
FIG. 7 is the circuit diagram of the single phase five-level inverter with the first circuit module M1 shown in FIG. 3 according to an embodiment of the invention.

As shown in FIG. 7, take the single phase five-level inverter combined with the first circuit module M1 shown in FIG. 3 for example to illustrate how it works. Six operational modes are provided.

Suppose the total voltage of DC power supply is $V_{dc}$. The term $V_{Ls}$ is used to refer to the voltage on the current limiting inductor $L_s$ when the current flows from left to right in the accompanied drawings. Both the said first capacitor $C_1$ voltage and the second capacitor $C_2$ voltage are half of $V_{dc}$ as their capacities are equal according to the embodiment. Since the said floating capacitor $C_s$ is charged by either the first capacitor $C_1$ or the second capacitor $C_2$, its voltage is half of $V_{dc}$ plus or minus the voltage $V_{Ls}$. The inductance of the current limiting inductor $L_s$ is so small that the voltage $V_{Ls}$ can even be ignored. So the voltage of the floating capacitor $C_s$ is very close to half of $V_{dc}$. The current in the filtering inductor $L_1$ flowing from left to right in the accompanied drawings is defined as positive current and the opposite as negative current. The circuits with solid lines in the accompanied drawings work and those with dotted lines don't work.

Figure 8:
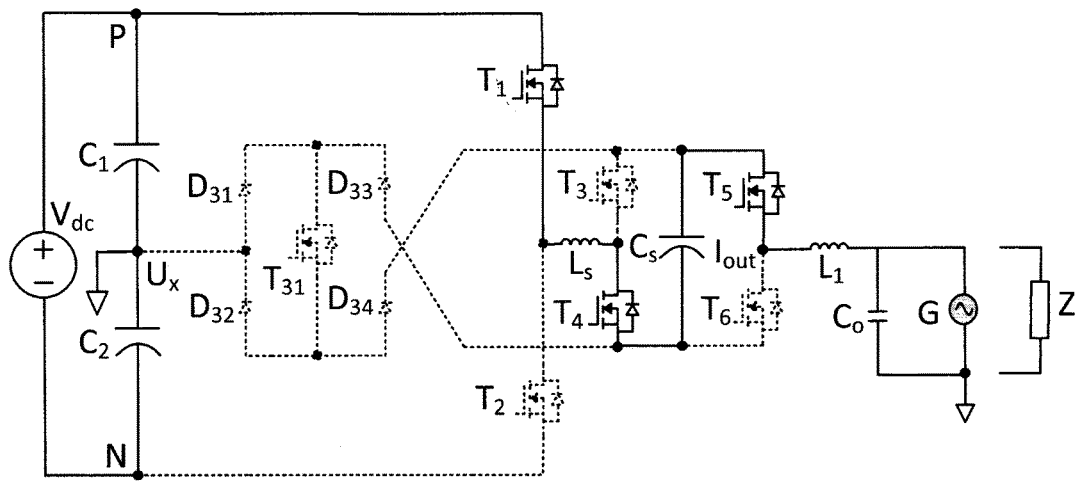
FIG. 8 is the first operational mode diagram of the single phase five-level inverter in FIG. 7 according to an embodiment of the invention.

For the first operational mode of the single phase five-level inverter shown in FIG. 8, the positive current flows as follows: $C_1 \rightarrow T_1 \rightarrow L_s \rightarrow T_4 \rightarrow C_s \rightarrow T_5 \rightarrow L_1 \rightarrow G \rightarrow C_1$, and the negative current flows: $C_1 \rightarrow G \rightarrow L_1 \rightarrow T_5 \rightarrow C_s \rightarrow T_4 \rightarrow L_s \rightarrow T_1 \rightarrow C_1$. The output voltage $U_{OX}$ from the inverter equals the sum of the floating capacitor $C_s$ voltage and the first capacitor $C_1$ voltage minus the voltage $V_{Ls}$. That is, $U_{OX}=0.5V_{dc}+0.5V_{dc}-V_{Ls} \approx V_{dc}$.

Figure 9:
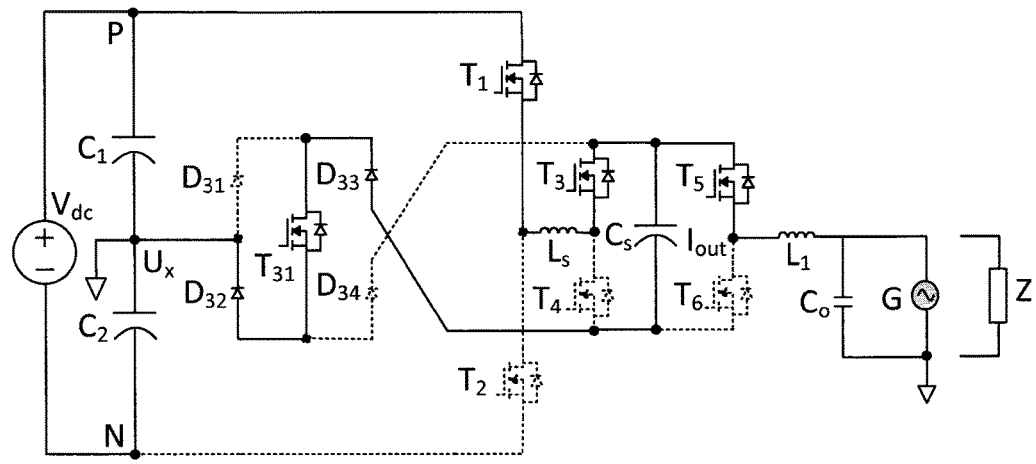
FIG. 9 is the second operational mode diagram of the single phase five-level inverter in FIG. 7 according to an embodiment of the invention.

For the second operational mode of the single phase five-level inverter shown in FIG. 9, the positive current flows as follows: $C_1 \rightarrow T_1 \rightarrow L_s \rightarrow T_3 \rightarrow T_5 \rightarrow L_1 \rightarrow G \rightarrow C_1$, and the negative current flows: $C_1 \rightarrow G \rightarrow L_1 \rightarrow T_5 \rightarrow T_3 \rightarrow L_s \rightarrow T_1 \rightarrow C_1$. The output voltage $U_{OX}$ from the inverter equals the said first capacitor $C_1$ voltage minus the voltage $V_{Ls}$. That is, $U_{OX}=0.5V_{dc}-V_{Ls} \approx 0.5V_{dc}$.

The floating capacitor $C_s$ is charged by the first capacitor $C_1$ in the second operational mode. The charging loop circuit is as follows: $C_1 \rightarrow T_1 \rightarrow L_s \rightarrow T_3 \rightarrow C_s \rightarrow D_{33} \rightarrow T_{31} \rightarrow D_{32} \rightarrow C_1$.

Figure 10:
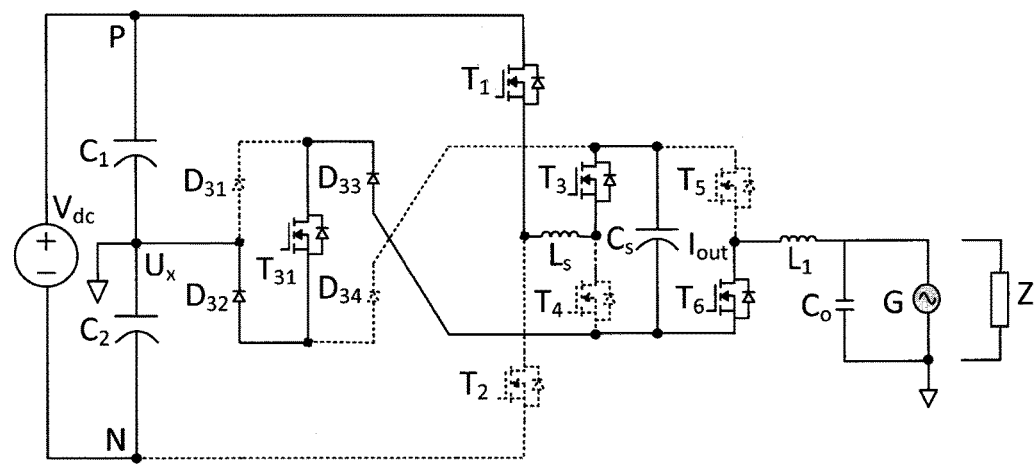
FIG. 10 is the third operational mode diagram of the single phase five-level inverter in FIG. 7 according to an embodiment of the invention.

For the third operational mode of the single phase five-level inverter shown in FIG. 10, the positive current flows as follows: $C_1 \rightarrow T_1 \rightarrow L_s \rightarrow T_3 \rightarrow C_s \rightarrow T_6 \rightarrow L_1 \rightarrow G \rightarrow C_1$, and the negative current flows: $C_1 \rightarrow G \rightarrow L_1 \rightarrow T_6 \rightarrow C_s \rightarrow T_3 \rightarrow L_s \rightarrow T_1 \rightarrow C_1$. The output voltage $U_{OX}$ from the inverter equals the said first capacitor $C_1$ voltage plus the minus floating capacitor $C_s$ voltage and the minus voltage $V_{Ls}$. That is, $U_{OX}=0.5V_{dc}+(-0.5V_{dc})-V_{Ls} \approx 0$. There is a charging loop circuit for the floating capacitor $C_s$. It is same as that in the second operational mode.

Figure 11:
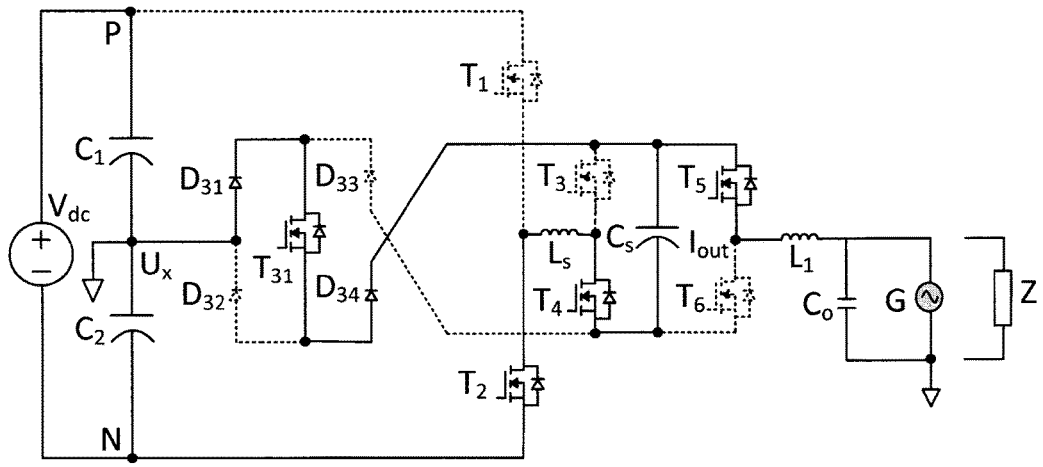
FIG. 11 is the fourth operational mode diagram of the single phase five-level inverter in FIG. 7 according to an embodiment of the invention.

For the fourth operational mode of the single phase five-level inverter shown in FIG. 11, the positive current flows as follows: $D_{31} \rightarrow T_{31} \rightarrow D_{34} \rightarrow T_5 \rightarrow L_1 \rightarrow G \rightarrow D_{31}$. There is a charging loop circuit for the floating capacitor $C_s$. It is as follows: $D_{31} \rightarrow T_{31} \rightarrow D_{34} \rightarrow C_s \rightarrow T_4 \rightarrow L_s \rightarrow T_2 \rightarrow C_2$. The output voltage $U_{OX}$ from the inverter equals the floating capacitor $C_s$ voltage plus the minus second capacitor $C_2$ voltage and the minus voltage $V_{Ls}$. That is, $U_{OX}=0.5V_{dc}+(-0.5V_{dc})-V_{Ls} \approx 0$.

Figure 12:
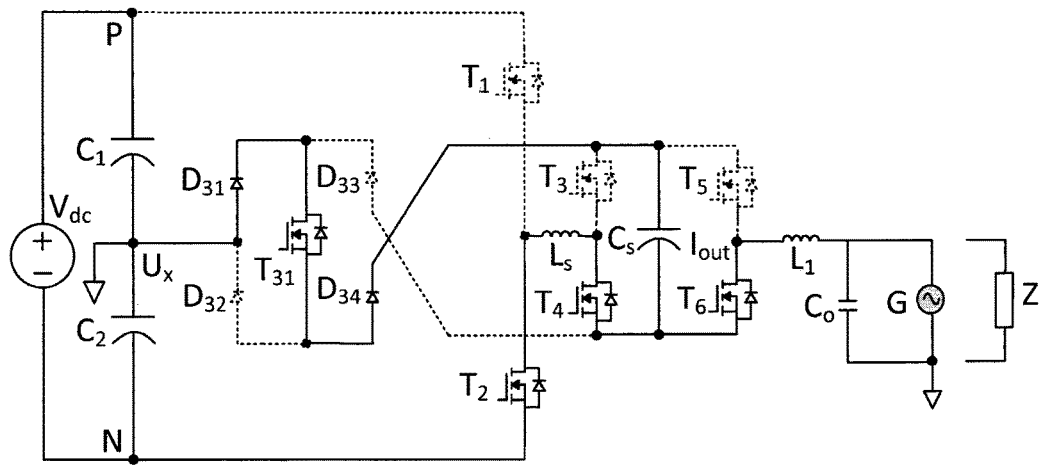
FIG. 12 is the fifth operational mode diagram of the single phase five-level inverter in FIG. 7 according to an embodiment of the invention.

For the fifth operational mode of the single phase five-level inverter shown in FIG. 12, the positive current flows as follows: $D_{31} \rightarrow T_{31} \rightarrow D_{34} \rightarrow C_s \rightarrow T_6 \rightarrow L_1 \rightarrow G \rightarrow D_{31}$. The floating capacitor $C_s$ is charged by the second capacitor $C_2$ through the following loop circuit: $D_{31} \rightarrow T_{31} \rightarrow D_{34} \rightarrow C_s \rightarrow T_4 \rightarrow L_s \rightarrow T_2 \rightarrow C_2$. The output voltage $U_{OX}$ from the inverter equals the minus floating capacitor $C_s$ voltage plus the minus voltage $V_{Ls}$. That is, $U_{OX}=-0.5V_{dc}-V_{Ls} \approx -0.5V_{dc}$.

Figure 13:
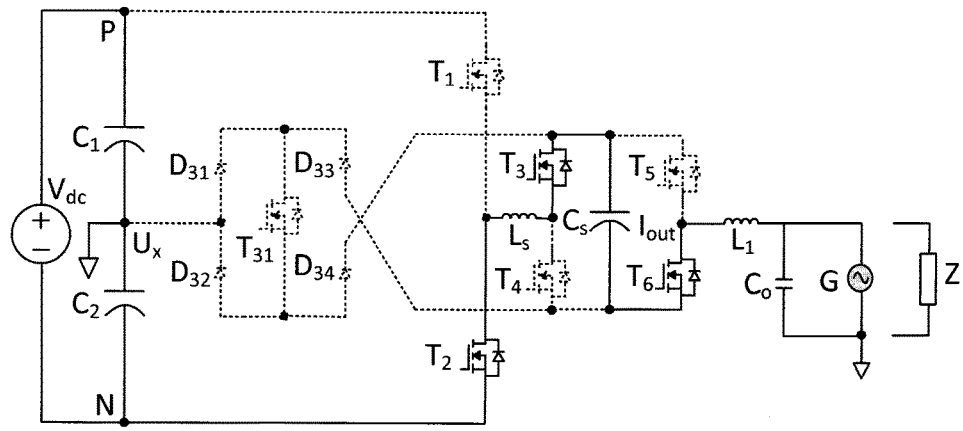
FIG. 13 is the sixth operational mode diagram of the single phase five-level inverter in FIG. 7 according to an embodiment of the invention.

For the sixth operational mode of the single phase five-level inverter shown in FIG. 13, the positive current flows as follows: $C_2 \rightarrow T_2 \rightarrow L_s \rightarrow T_3 \rightarrow C_s \rightarrow T_6 \rightarrow L_1 \rightarrow G \rightarrow C_2$, and the negative current flows: $C_2 \rightarrow G \rightarrow L_1 \rightarrow T_6 \rightarrow C_s \rightarrow T_3 \rightarrow L_s \rightarrow T_2 \rightarrow C_2$. The output voltage $U_{OX}$ from the inverter equals the minus floating capacitor $C_s$ voltage plus the minus second capacitor $C_2$ voltage and the minus voltage $V_{Ls}$. That is, $U_{OX}=(-0.5V_{dc})+(-0.5V_{dc})-V_{Ls} \approx -V_{dc}$.

The single phase five-level inverter in FIG. 7 works alternately among the six above-mentioned operational modes by controlling either of the on and off states of each switch to output the expected voltage.

The voltage $V_{Ls}$ is so small that it is ignored. For the first operational mode, the output voltage $U_{OX}$ from the single phase five-level inverter equals the sum of the first capacitor $C_1$ voltage and the floating capacitor $C_s$ voltage; for the sixth operational mode, the output voltage $U_{OX}$ equals the sum of the minus floating capacitor $C_s$ voltage and the minus second capacitor $C_2$ voltage. The peak-peak value of AC output voltage from inverter equals $2V_{dc}$. So the voltage utilization ratio of the single phase five-level inverter in the invention equals two. Under the same operating conditions, the voltage utilization ratio of the single phase five-level inverter in the invention is twice that of the present single phase five-level half-bridge inverter where the floating capacitor is absent. As the single phase five-level inverter outputs five mutually different voltage levels including zero, the ripple voltage is smaller than that of the single phase three-level inverter. Therefore, the inductance of the filtering inductor $L_1$ is smaller than that of the single phase three-level inverter.

There is no free-wheeling loop circuit in need for the current limiting inductor $L_s$ as it works as either a current-limiting device or a filtering inductor.

Figure 14:
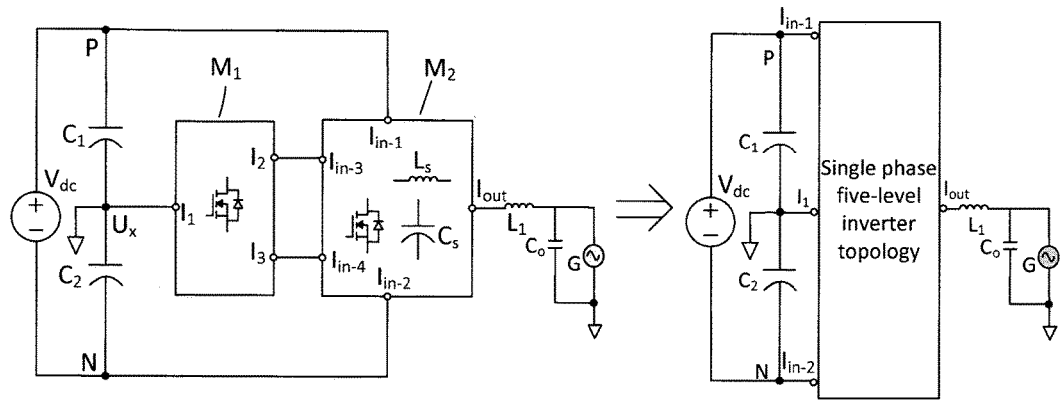
FIG. 14 (a) is an equivalent block circuit diagram of the single phase five-level inverter topology according to an embodiment of the invention.
Figure 14:
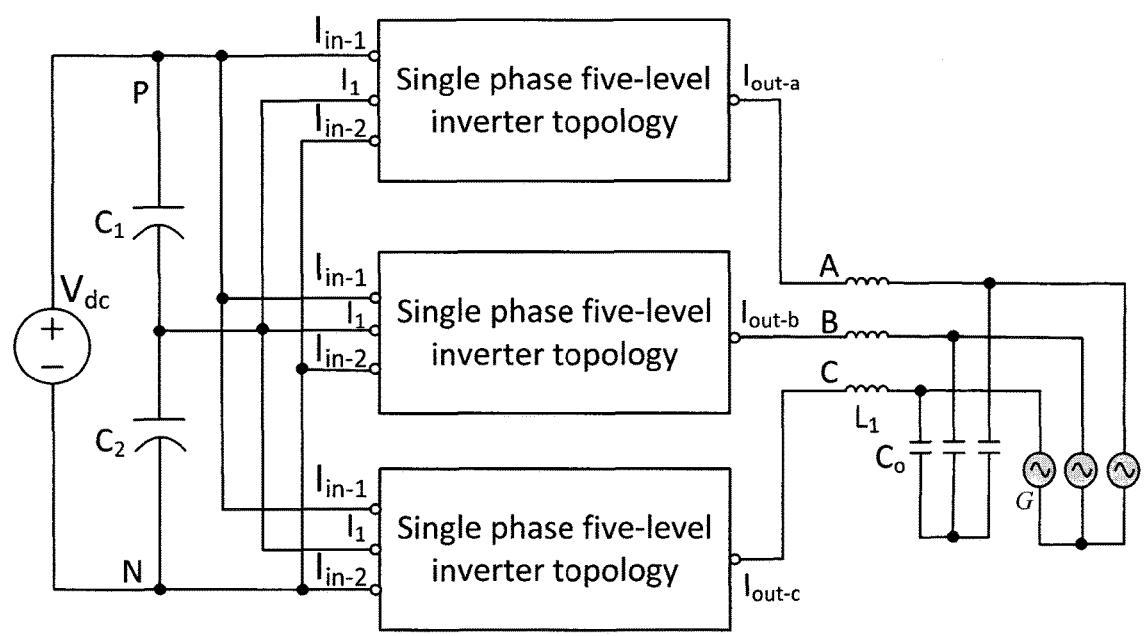

FIG. 14(a) shows an equivalent block circuit diagram of the single phase five-level inverter topology. As shown in FIG. 14(a), the first input terminal $I_{in-1}$ of the second circuit module M2 is defined as the first DC input terminal of the single phase five-level inverter topology, the first terminal $I_1$ of the first circuit module M1 is defined as the second DC input terminal, and the second input terminal $I_{in-2}$ of the second circuit module M2 is defined as the third DC input terminal. The output terminal $I_{out}$ of the second circuit module M2 is defined as the output terminal of the single phase five-level inverter topology.

FIG. 14(b) is the circuit diagram in partial block form of a three-phase five-level inverter topology based on the equivalent circuit in FIG. 14(a). As shown in FIG. 14(b), it comprises three of the single phase five-level inverter topologies. The three single phase five-level inverter topologies are connected in parallel at their input sides. That is to say, all the first DC input terminals are connected to the positive terminal of the first capacitor $C_1$; all the second DC input terminals are connected to the common terminal of the first capacitor $C_1$ and the second capacitor $C_2$; and all the third DC input terminals are connected to the negative terminal of the second capacitor $C_2$. The AC output terminals of the three single phase five-level inverter topologies are respectively connected to three phases of AC utilities or AC load.

Each of the first circuit module M1 of the three single phase five-level inverter topologies in FIG. 14(b) can employ any one shown in from FIG. 3 to FIG. 6. The three circuit modules (M1) with the same circuits are preferred as it is more flexible from manufacturing point of view. For example, they all use the first circuit module M1 shown in FIG. 3.

It is noted that three-phase AC voltage is widely used. They are shown as an example in this specification. It is understood that other multiple phase configurations, such as four-phase, five-phase, etc., AC voltage can also be generated using the same method as described here. This can be appreciated by any person in the field of art.

The voltage utilization ratio of the three-phase five-level inverter in the invention is twice that of the present three-phase five-level half-bridge inverter under the same operating conditions, so the current is reduced to half of the latter. Because of the low current, the cost for the elements in the inverter is reduced, and the AC filtering inductance is smaller than that of the three-level half-bridge inverter for the same filtering effect. The mid-point voltage between the first capacitor $C_1$ and the second capacitor $C_2$ is balanced as they alternatively charging the floating capacitor with an equality of opportunity. That is to say, the DC link mid-point voltage can be balanced without additional circuitry.

The five-level inverter topology provided in the invention can be used for, but not limited to, renewable energy power system, such as single-phase or three-phase photovoltaic system, as well as three-phase motor drive.

Each embodiment in the part of the detailed description of the embodiments goes forward one by one. The differences among the embodiments are focused on, and the same or similar among all the embodiments is easy to be understood by making a cross-reference.

Note that the relationship terms like "first", "second" and so on are used in the invention just for the sake of description and not to indicate any real relationship or sequence among them.

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A single phase five-level inverter topology for use with two serially connected DC power supplies, comprising a half-bridge inverter circuit;
   wherein the common terminal of the two DC power supplies is connected to the load of the half-bridge inverter circuit;
   the half-bridge inverter circuit comprises a first circuit module and a second circuit module; the first circuit module in the half-bridge inverter circuit is connected between the two DC power supplies and the second circuit module;
   the second circuit module comprises at least a floating capacitor, a current limiting device; the current limiting device is located in the charging circuit loop of the floating capacitor to limit the surge current when the floating capacitor is charged;
   the first circuit module provides at least two circuit branches between either of the two DC power supplies and the second circuit module;
   the two circuit branches are extended to the floating capacitor inside of the second circuit module;
   the floating capacitor is charged by the first DC power supply or the second DC power supply;
   the second circuit module outputs five mutually different voltage levels including zero;
   either the first DC power supply or the second DC power supply provides power to the load of the half-bridge inverter circuit, or the first DC power supply or the second DC power supply alternatively added algebraically to the floating capacitor provides power to the load of the half-bridge inverter circuit.

2. The single phase five-level inverter topology of claim 1, wherein the first circuit module in the half-bridge inverter circuit comprises a first terminal, a second terminal, and a third terminal;
   there is at least one circuit branch between the first terminal and the second terminal of the first circuit module;
   there is at least one circuit branch between the first terminal and the third terminal of the first circuit module;
   the first terminal of the first circuit module is connected to the common terminal of the two DC power supplies;
   the second circuit module further comprises a first input terminal, a second input terminal, a third input terminal, a fourth input terminal and an output terminal;
   there is at least one circuit branch between each of the input terminals and the output terminal;
   the second terminal of the first circuit module is connected to the third input terminal of the second circuit module and the third terminal of the first circuit module is connected to the fourth input terminal of the second circuit module;

the first input terminal of the second circuit module is connected to the positive terminal of the first DC power supply and the second input terminal of the second circuit module is connected to the negative terminal of the second DC power supply;

the output terminal of the second circuit module is connected to a first terminal of AC utilities or AC load.

3. The single phase five-level inverter topology of claim 2, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

4. The single phase five-level inverter topology of claim 2, wherein the current limiting device is a current limiting inductor.

5. The single phase five-level inverter topology of claim 4, wherein the second circuit module in the half-bridge inverter circuit further comprises a first switching circuit branch, a second switching circuit branch, a third switching circuit branch, a fourth switching circuit branch, a fifth switching circuit branch and a sixth switching circuit branch;

the first terminal of the first switching circuit branch is connected to the first input terminal of the second circuit module;

the second terminal of the first switching circuit branch is connected to the first terminal of the second switching circuit branch;

the second terminal of the second switching circuit branch is connected to the second input terminal of the second circuit module;

the first terminal of the third switching circuit branch is connected to both the third input terminal of the second circuit module and the positive terminal of the floating capacitor;

the second terminal of the third switching circuit branch is connected to the first terminal of the fourth switching circuit branch;

the second terminal of the fourth switching circuit branch is connected to both the fourth input terminal of the second circuit module and the negative terminal of the floating capacitor;

the common terminal of the third and the fourth switching circuit branches is connected to the common terminal of the first switching circuit branch and the second switching circuit branch ;

the first terminal of the fifth switching circuit branch is connected to the positive terminal of the floating capacitor;

the second terminal of the fifth switching circuit branch is connected to the first terminal of the sixth switching circuit branch;

the second terminal of the sixth switching circuit branch is connected to the negative terminal of the floating capacitor;

the common terminal of the fifth and the sixth switching circuit branches is connected to the output terminal of the second circuit module.

6. The single phase five-level inverter topology of claim 5, wherein each of the six switching circuit branches comprises at least one bidirectional switch;

the first terminal of each bidirectional switch is connected to the first terminal of the switching circuit branch in which it is located;

the second terminal of each bidirectional switch is connected to the second terminal of the switching circuit branch in which it is located.

7. The single phase five-level inverter topology of claim 6, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

8. The single phase five-level inverter topology of claim 5, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

9. The single phase five-level inverter topology of claim 4, wherein the second circuit module in the half-bridge inverter circuit further comprises a floating capacitor, a first bidirectional switch, a second bidirectional switch, a third bidirectional switch, a fourth bidirectional switch, a fifth bidirectional switch, a sixth bidirectional switch, a seventh bidirectional switch, an eighth bidirectional switch, a first current-limiting inductor and a second current-limiting inductor;

the first terminal of the first bidirectional switch is connected to the positive terminal of the first capacitor and the second terminal of the first bidirectional switch is connected to both the third terminal of the first circuit module and the first terminal of the second current-limiting inductor;

the first terminal of the second bidirectional switch is connected to both the second terminal of the first circuit module and the first terminal of the first current-limiting inductor;

the second terminal of the second bidirectional switch is connected to the negative terminal of the second capacitor;

the second terminal of the third bidirectional switch is connected to the first terminal of the first bidirectional switch and the first terminal of the third bidirectional switch is connected to the first terminal of the fifth bidirectional switch;

the second terminal of the fifth bidirectional switch is connected to both the second terminal of the first current-limiting inductor and the positive terminal of the floating capacitor;

the first terminal of the sixth bidirectional switch is connected to both the second terminal of the second current-limiting inductor and the negative terminal of the floating capacitor;

the second terminal of the sixth bidirectional switch is connected to the second terminal of the fourth bidirectional switch whose first terminal is connected to the second terminal of the second bidirectional switch;

the first terminal of the seventh bidirectional switch is connected to the positive terminal of the floating capacitor and the second terminal of the seventh bidirectional switch is connected to the first terminal of the eighth bidirectional switch;

the second terminal of the eighth bidirectional switch is connected to the negative terminal of the floating capacitor;

the common terminal of the seventh bidirectional switch and the eighth bidirectional switch is connected to the output terminal of the second circuit module.

10. The single phase five-level inverter topology of claim 9, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

11. The single phase five-level inverter topology of claim 4, further comprises a filtering inductor which is connected between the output terminal of the second circuit module and the first terminal of AC utilities or AC load.

12. The single phase five-level inverter topology of claim 11, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

13. The single phase five-level inverter topology of claim 4, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

14. The single phase five-level inverter topology of claim 4, wherein either of the circuit branches connected between the first terminal and the second terminal of the first circuit module and between the first terminal and the third terminal of the first circuit module comprises at least one bidirectional switch.

15. The single phase five-level inverter topology of claim 14, wherein the first circuit module in the half-bridge inverter circuit further comprises a first bidirectional switch, a first diode, a second diode, a third diode, and a fourth diode;

the positive terminal of the first diode is connected to the first terminal of the first circuit module and the negative terminal of the first diode is connected to the first terminal of the first bidirectional switch;

the negative terminal of the third diode is connected to the negative terminal of the first diode, and the positive terminal of the third diode is connected to the third terminal of the first circuit module;

the negative terminal of the second diode is connected to the positive terminal of the first diode, and the positive terminal of the second diode is connected to both the second terminal of the first bidirectional switch and the positive terminal of the fourth diode;

the negative terminal of the fourth diode is connected to the second terminal of the first circuit module.

16. The single phase five-level inverter topology of claim 15, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

17. The single phase five-level inverter topology of claim 14, wherein the first circuit module in the half-bridge inverter circuit further comprises a first bidirectional switch, a second bidirectional switch, a first diode and a second diode;

the positive terminal of the first diode is connected to the negative terminal of the second diode and the negative terminal of the first diode is connected to the first terminal of the first bidirectional switch;

the second terminal of the first bidirectional switch is connected to the second terminal of the first circuit module;

the positive terminal of the second diode is connected to the second terminal of the second bidirectional switch whose first terminal is connected to the third terminal of the first circuit module;

the common terminal of the first diode and the second diode is connected to the first terminal of the first circuit module.

18. The single phase five-level inverter topology of claim 17, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

19. The single phase five-level inverter topology of claim 14, wherein the first circuit module in the half-bridge inverter circuit further comprises a first bidirectional switch, a second bidirectional switch, a first diode, a second diode, a third diode, a fourth diode, a fifth diode, a sixth diode, a seventh diode and an eighth diode;

the positive terminal of the first diode is connected to the negative terminal of the second diode and the negative of the first diode is connected to the first terminal of the first bidirectional switch;

the positive terminal of the second diode is connected to the second terminal of the first bidirectional switch;

the common terminal of the first diode and the second diode is connected to the first terminal of the first circuit module;

the positive terminal of the third diode is connected to the negative terminal of the fourth diode and the negative of the third diode is connected to the first terminal of the first bidirectional switch;

the positive terminal of the fourth diode is connected to the second terminal of the first bidirectional switch;

the common terminal of the third diode and the fourth diode is connected to the second terminal of the first circuit module;

the positive terminal of the fifth diode is connected to the negative terminal of the sixth diode and the negative terminal of the fifth diode is connected to the first terminal of the second bidirectional switch;

the positive terminal of the sixth diode is connected to the second terminal of the second bidirectional switch;

the common terminal of the fifth diode and the sixth diode is connected to the first terminal of the first circuit module;

the positive terminal of the seventh diode is connected to the negative terminal of the eighth diode and the negative of the seventh diode is connected to the first terminal of the second bidirectional switch;

the positive terminal of the eighth diode is connected to the second terminal of the second bidirectional switch;

the common terminal of the seventh diode and the eighth diode is connected to the third terminal of the first circuit module.

20. The single phase five-level inverter topology of claim 19, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

21. The single phase five-level inverter topology of claim 14, wherein the first circuit module in the half-bridge inverter circuit further comprises a first bidirectional switch, a second bidirectional switch, a third bidirectional switch and a fourth bidirectional switch;

the second terminal of the first bidirectional switch is connected to the first terminal of the second bidirectional switch and the first terminal of the first bidirectional switch is connected to the first terminal of the third bidirectional switch;

the second terminal of the third bidirectional switch is connected to the second terminal of the first circuit module;

the common terminal of the first bidirectional switch and the second bidirectional switch is connected to the first terminal of the first circuit module;

the second terminal of the second bidirectional switch is connected to the second terminal of the fourth bidirectional switch whose first terminal is connected to the third terminal of the first circuit module.

22. The single phase five-level inverter topology of claim 21, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

23. The single phase five-level inverter topology of claim 14, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

24. The three-phase configuration of claim 23, wherein the first circuit modules in the three single phase five-level inverter topologies are the same and the second circuit modules in the three single phase five-level inverter topologies are the same.

25. The single phase five-level inverter topology of claim 1, wherein three said single phase five-level inverter topologies are connected together in a three phase configuration;

wherein the three single phase five-level inverter topologies are connected in parallel at their input sides;

the AC output terminals of the three single phase five-level inverter topologies are respectively connected to three phases of AC utilities or AC load.

* * * * *